US010696571B2

(12) United States Patent
Stadermann et al.

(10) Patent No.: US 10,696,571 B2
(45) Date of Patent: Jun. 30, 2020

(54) MULTIPLE PULSE CHARGE TRANSFER FOR CAPACITIVE DEIONIZATION OF A FLUID

(71) Applicant: Lawrence Livermore National Security, LLC, Livermore, CA (US)

(72) Inventors: Michael Stadermann, Pleasanton, CA (US); Steven L. Hunter, Livermore, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 225 days.

(21) Appl. No.: 15/299,021

(22) Filed: Oct. 20, 2016

(65) Prior Publication Data
US 2018/0111854 A1    Apr. 26, 2018

(51) Int. Cl.
*C02F 1/469*    (2006.01)

(52) U.S. Cl.
CPC .... *C02F 1/4691* (2013.01); *C02F 2201/4612* (2013.01)

(58) Field of Classification Search
CPC ..................................................... C02F 1/4691
See application file for complete search history.

(56) References Cited

U.S. PATENT DOCUMENTS

| 5,425,858 A * | 6/1995 | Farmer ................ B01J 47/08 204/164 |
| 5,559,402 A | 9/1996 | Corrigan, III |
| 2008/0105551 A1* | 5/2008 | Wang ................ C02F 1/4691 204/627 |
| 2013/0118918 A1* | 5/2013 | Servida ................ C02F 1/4691 205/744 |
| 2013/0270116 A1* | 10/2013 | Hu ................ C02F 1/4691 204/661 |
| 2013/0342028 A1 | 12/2013 | Hermann et al. |
| 2014/0327457 A1 | 11/2014 | Diewald et al. |

FOREIGN PATENT DOCUMENTS

EP    0699015 A1    2/1996

OTHER PUBLICATIONS

Alkuran, Mohammad et al. "Highly Efficient Capacitive De-Ionization (CDI) Water Purification System Using a Buck-Boost Converter," Applied Power Electronics Conferencne and Exposition, 2008. APEC 2008. Twenty-Third Annual IEEE. IEEE, 2008, pp. 1926-1930.
International Search Report and Written Opinion issued in International Application No. PCT/US2017/057341, dated Feb. 1, 2018, 9 pp.

* cited by examiner

*Primary Examiner* — Salil Jain
(74) *Attorney, Agent, or Firm* — Harness, Dickey & Pierce PLC

(57) ABSTRACT

The present disclosure relates to a capacitive deionization system which makes use of a controller, a first capacitor acting as a first electrode, a second capacitor acting as a second electrode, and a first inductor for storing energy received from the first capacitor, and transferring the stored energy to the second capacitor. A first plurality of electronic switches are controlled by the controller to control communication between the first inductor and the first capacitor, and between the first inductor and the second capacitor. An additional energy transfer subsystem is included which has a second inductor for receiving energy from the first capacitor while the first inductor is transferring stored energy to the second capacitor.

13 Claims, 4 Drawing Sheets

MULTIPLE PULSE CHARGE TRANSFER FOR CAPACITIVE DEIONIZATION OF A FLUID

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to systems and methods for deionization of fluids, and more particularly to a system and method for capacitive deionization of a fluid containing ions, such as salt, which may contain other chemicals such as nitrates, heavy metals, scalant, etc., using multiple inductors and electronic switches to significantly improve the efficiency of the system.

BACKGROUND

This section provides background information related to the present disclosure which is not necessarily prior art.

There is a presently a strong interest in improving the economics of a water desalination system. Water desalination is expected to continue growing in importance over the coming years as shortages of fresh water continue to be experienced in various regions around the world, and especially in those regions bordering bodies of salt water.

Capacitive deionization is one method of desalination which removes salt from water by using electric fields. However, due to finite charge capacity, the capacitors used in such systems have to be charged and discharged in a continuous cycle of desalination and regeneration. This is done optimally by transferring the charge between two capacitors, and only adding additional energy to the system as energy is resistively dissipated. In a typical capacitive deionization system, the desalination (removal of ions from the water) takes place when the capacitor is charging, and the regeneration (removal of salt from the capacitor) takes place when the electrode is discharging. While there are capacitive desalination systems in which the charge states are reversed, the charging step will be called the desalination step, and the discharging step will be called the regeneration step throughout this document.

The conventional means of doing this transfer is by using a buck boost converter. Such a circuit is shown in FIG. 1. This circuit transfers energy from one electrode (C1) to an inductor (L1), then from the inductor to another electrode (C2). This transfer is done in two steps, and current passes through each electrode only half the time. Electrode 1 (capacitor C1) discharges when electronically controlled switch M3, in the form of a FET, is on (conducting) and electronically controlled switch M1, also in the form of a FET, is off (non-conducting). Current flows into the inductor (L1) and the inductor begins storing the energy from electrode 1 (C1) in its magnetic field. When the current through the inductor reaches a predetermined maximum, then electronically controlled switch M3 is turned off and electronically controlled switch M1 is turned on. At this point the inductor begins transferring its magnetic field energy through electronically controlled switch M1 to the electrode 2 (capacitor C2). When the current flow in the inductor reaches a predetermined minimum, electronically controlled switch M1 is turned off and electronically controlled switch M3 is turned on, and the above cycle repeats itself. It takes many cycles to transfer all of the energy from capacitor C1 to capacitor C2. As such, each one of the electrodes 1 and 2 is only charging or discharging one half the time during any given charging or discharging cycle. This means that it takes twice as long to fully charge an electrode than it would if the charging process was continuous at the same average current. It also means that it takes twice as long to fully discharge one of the electrodes than it would if the discharging process was continuous. One method to speed up the transfer of charge from electrode 1 to the inductor, and then from the inductor to electrode 2, is to allow a greater current flow during the charge transfer process. Thus, using a higher current flow will improve the throughput of the system, but increasing the magnitude of current flow will also increase the power dissipation due to the internal resistances of the electrodes and cables.

In view of the foregoing, any system or method that is able to decrease the total charge transfer time without increasing the power dissipation experienced by the system would significantly improve the efficiency of a capacitive desalinization system.

SUMMARY

This section provides a general summary of the disclosure, and is not a comprehensive disclosure of its full scope or all of its features.

In one aspect the present disclosure relates to a capacitive deionization system. The system may comprise a controller, a first capacitor acting as a first electrode, a second capacitor acting as a second electrode, and a first inductor for storing energy received from the first capacitor, and transferring the stored energy to the second capacitor. A first plurality of electronic switches may be included which are each controlled by the controller for controlling communication between the first inductor and the first capacitor, and the first inductor and the second capacitor. An additional energy transfer subsystem may be included which includes a second inductor for receiving energy from the first capacitor while the first inductor is transferring the energy to the second capacitor.

In another aspect the present disclosure relates to a capacitive deionization system comprising a controller, a first capacitor acting as a first electrode, a second capacitor acting as a second electrode, and a first inductor. The first inductor stores energy received from the first capacitor, and transfers the stored energy to the second capacitor. First and second electronic switches, controlled by the controller, are included for controlling a transfer of energy from the first capacitor to the first inductor, and from the first inductor to the second capacitor. An additional energy transfer subsystem includes third and fourth electronic switches controlled by the controller, and a second inductor. The second inductor receives energy from the first capacitor while the third electronic switch is closed and the fourth electronic switch is opened, and transfers the stored energy to the second capacitor when the third electronic switch is opened and the fourth electronic switch is closed. The controller is configured to control the first, second, third and fourth electronic switches such that the second inductor is receiving energy from the first capacitor while the first inductor is transferring its energy stored therein to the second capacitor, and further such that the first inductor is receiving energy from the first capacitor while the second inductor is transferring its stored energy to the second capacitor.

In still another aspect the present disclosure relates to a method for performing capacitive deionization. The method may comprise using a first capacitor to act as a first electrode to receive a flow of a fluid containing ions through the first electrode and to remove ions from the ionized fluid. The method may also comprise using a second capacitor to act as a second electrode to help remove energy built up on the first capacitor. The method may further involve using a first inductor to store energy transferred from the first capacitor, and transferring the stored energy on the first inductor to the second capacitor. The method may further involve using a first plurality of electronic switches controlled by a controller to control communication between the first inductor and the first capacitor, and communication between the first inductor and the second capacitor. The method may also involve using an additional energy transfer subsystem including a second inductor for receiving energy from the first capacitor while the first inductor is transferring the stored energy to the second capacitor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 4:
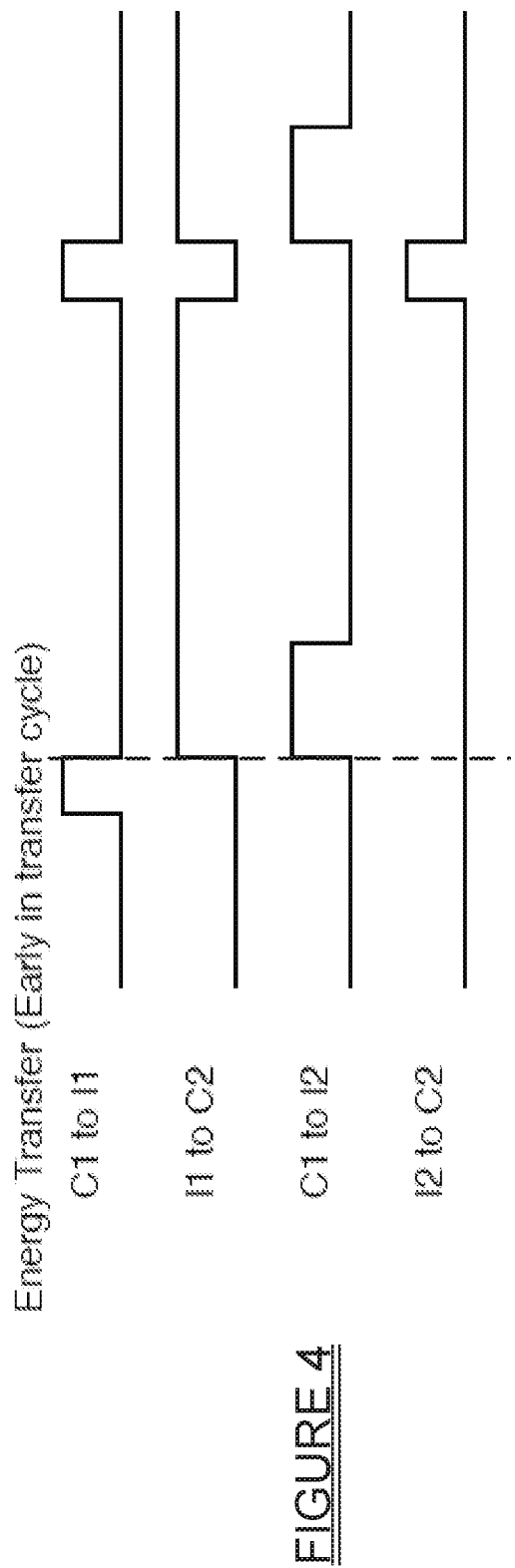
Figure 5:
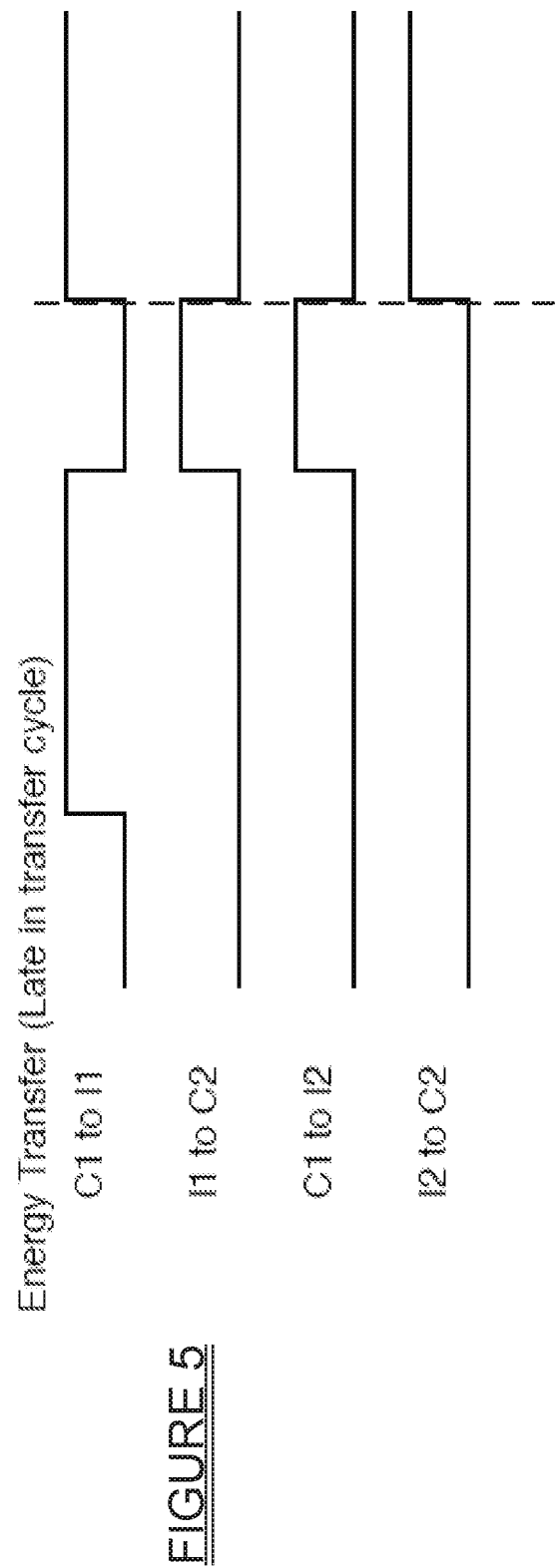

FIG. 4 is a series of plurality of diagrams to illustrate the timing of energy transfer between capacitor C1 and inductors L1 and L2, as well as from inductors L1 and L2 to capacitor C2, early in the transfer cycle; and FIG. 5 shows a series of plurality of timing diagrams for the same energy transfer operations of FIG. 4, but late in the transfer cycle (i.e., as C2 is its approaching maximum energy storage).

Corresponding reference numerals indicate corresponding parts throughout the several views of the drawings.

DETAILED DESCRIPTION

Example embodiments will now be described more fully with reference to the accompanying drawings.

The present disclosure involves a system and method for capacitive deionization. The system and method may be used for deionizing any fluid containing ions, and therefore for removing salt, which may include nitrates, heavy metals, scalant, etc., from an fluid containing the ions. In one particular implementation the system and method forms a desalination system for removing salt from salt water. Accordingly, while the following discussion will reference a desalination system as an example implementation, it will be appreciated that the system and method of the present disclosure is not limited to only desalination systems.

The present system and method makes use of a buck boost circuit, but with an additional inductor and two additional switches incorporated into the buck boost circuit to significantly reduce the time required to transfer the charge from one electrode to another electrode. In one embodiment the two additional switches are transistors. A first electrode charges a first inductor of the circuit through a first pulse, and while the first inductor charges a second electrode, the first electrode charges a second inductor through a second pulse. By providing two inductors between which the two electrodes can alternate, the charge transfer rate is doubled without increasing the I-R losses of the circuit. To maintain high energy efficiency while increasing the transfer rate, the conditions that are used to switch from a first inductor to a second inductor have to be carefully chosen. A microcontroller senses the current in various parts of the circuit and controls the timing of the switching action of the pair of transistors to maximize the system throughput and efficiency. Choosing the proper threshold for operating the additional pair of switches is important to assure efficient charge transfer.

Figure 1:
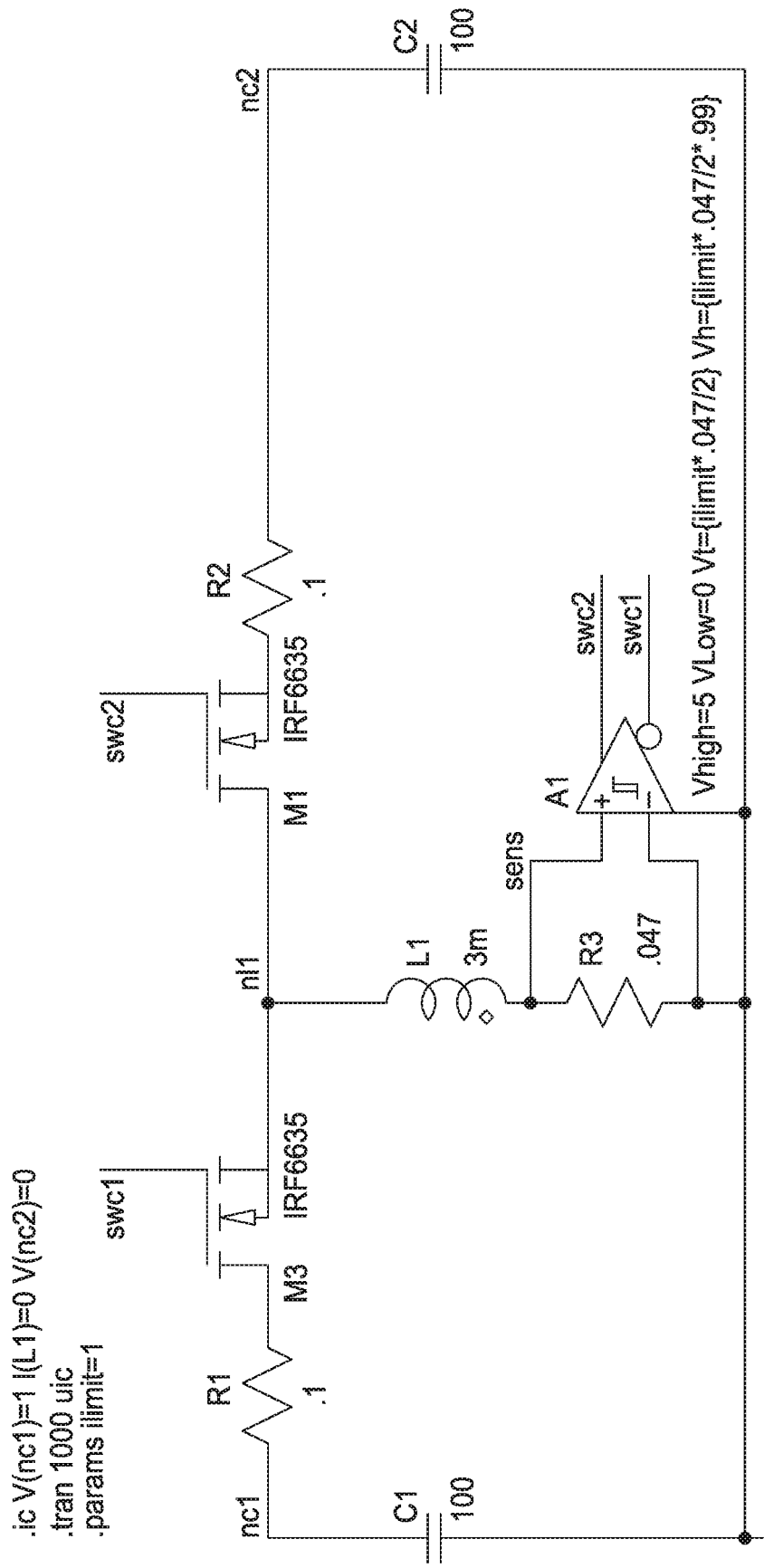
FIG. 1 is a simplified schematic diagram of a prior art buck boost converter circuit forming a capacitive deionization system.
Figure 2:
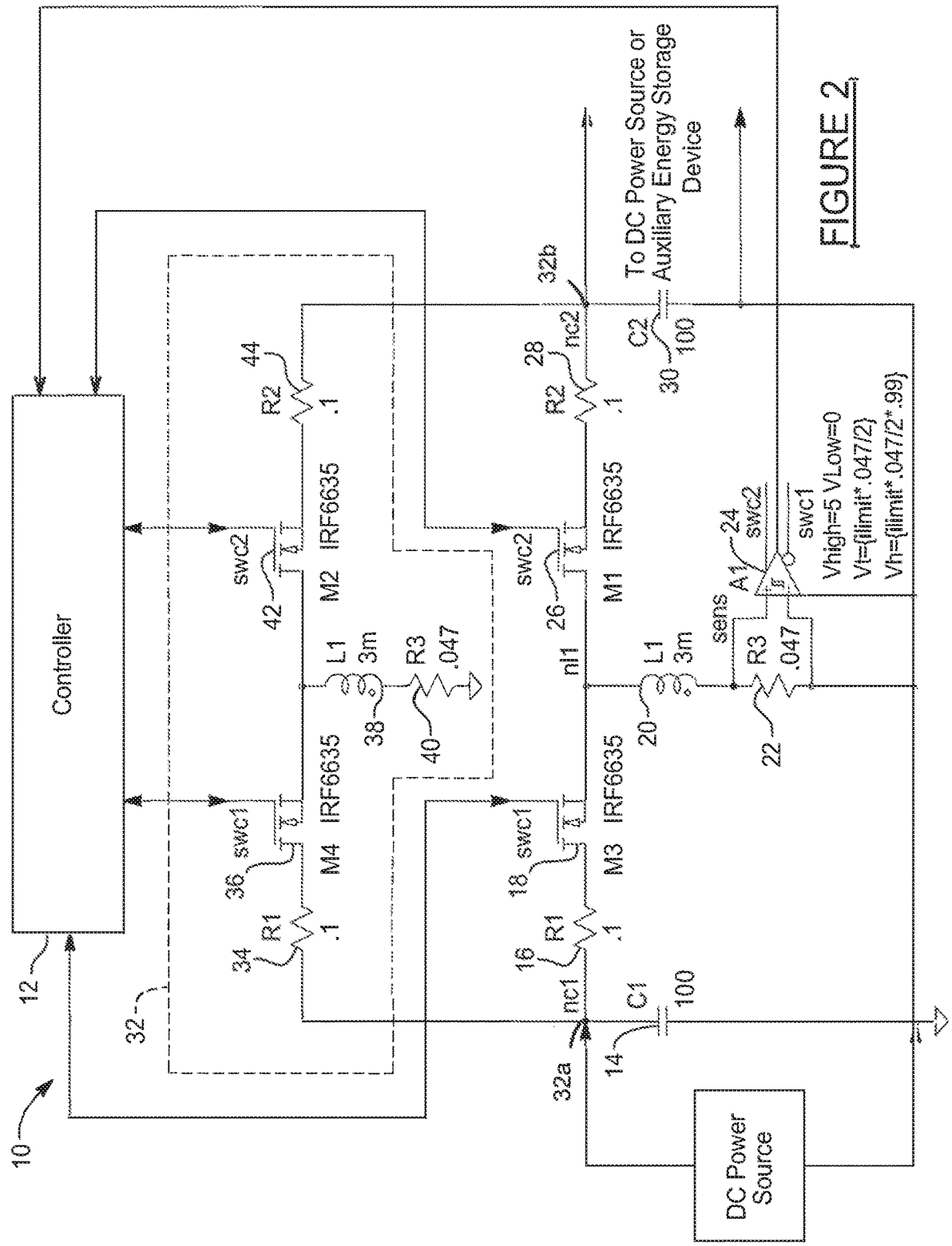
FIG. 2 is a schematic of one embodiment of a capacitive deionization system in accordance with the present disclosure which includes a buck boost converter circuit that makes use of an additional energy transfer subsystem to significantly improve the efficiency of the system.

Referring to FIG. 2, a capacitive deionization system, which in this example forms a desalination circuit 10 in accordance with one embodiment of the present disclosure, is shown. The system 10 includes a controller 12, a first capacitor (C1) 14, a first resistance (R1) 16, a first electronic switch in the form of a FET 18, a first inductor (L1) 20, a current sensing resistor (R3) 22, a voltage detection circuit 24 coupled across the current sensing resistor 22, a second electronic switch 26 in the form of a FET, a second resistance 28 and a second capacitor 30. First resistance 16 and second resistance 28 each represent a series resistance associated with the conductors coupled to the first capacitor 14 and the second capacitor 30, respectively. First capacitor 14 forms a first electrode that is used during a desalination cycle in which ions are removed from salt water flowing through the electrode formed by the first capacitor when the first capacitor is fully charged. This operation desalinates the water flowing through the first electrode formed by the first capacitor 14. The second capacitor 30 is used to receive energy from the inductor 20 during a regeneration cycle in which ions are removed from the first capacitor 14, and to store the energy removed from the first capacitor for use during the following desalination cycle in which the first capacitor 14 is charged and again used during the purification cycle. The controller 12 controls the two FETs 18 and 26, alternatively turning one on while the other is turned off, to enable the energy transfer from the first capacitor 14 to the first inductor 20, and then from the first inductor to the second capacitor 30. The energy stored in the second capacitor 30 may be transferred to another auxiliary storage device, or back to first capacitor 14 (C1) for the following desalination cycle. This operation repeats until the voltage on the first capacitor 14 reaches a predefined minimum. This operation is essentially the same as that described for the prior art circuit shown in FIG. 1.

The system 10 differs from the prior art circuit of FIG. 1 by the incorporation of an additional energy transfer subsystem 32 which enables a new pulse to be generated, which enables a new cycle of energy transfer from the first capacitor 14 to be initiated while the first inductor 20 is discharging its stored energy to the second capacitor 30. In other words, there is no need to wait for the first inductor 20 to finish transferring its energy to the second capacitor 30 before starting a new energy transfer cycle to remove additional stored energy from the first capacitor 14.

The additional energy transfer subsystem 32 incorporates a third series resistance 34 tied at one side to the first capacitor 14 at connection point 32a, a third electronic switch 36 in the form of a FET, a second inductor 38, a fourth series resistance 40, a fourth electronic switch 42 in the form of a FET, and a fifth series resistance 44 tied to the second capacitor 30 at connection point 32b. Series resistances 34 and 44 represent the internal resistances of the desalination electrodes (i.e., capacitors C1 and C2). The third and fourth FETs 36 and 42 are also in communication with the controller 12.

During operation the controller 12 monitors the voltage across the current sensing resistor 22 and when this current reaches a predetermined maximum current, first FET 18 is turned off and the second FET 26 is turned on to allow energy transfer to begin from the charged first inductor 20 to the second capacitor 30. During the time that the first inductor 20 is receiving energy from the first capacitor 14, the third FET 36 is turned off and the fourth FET 42 is turned on. But when the first FET 18 is turned off and the second FET 26 is turned on to allow the first inductor 20 to begin transferring its stored energy to the second capacitor 30, the controller 12 will turn on the third FET 36 and turn off the fourth FET 42. This allows additional energy stored in the first capacitor 14 to begin being transferred through the third FET 36 to the second inductor 38. When the first FET 18 is again switched on and the second FET 26 is switched off to initiate another charging of the first inductor 20, the third FET 36 is switched off and the fourth FET 42 is switched on to initiate a transfer of the energy stored in the second inductor 38 to the second capacitor 30. It will be appreciated then that energy transfer from the first capacitor 14 to the second inductor 38 thus begins as soon as the energy transfer to the first inductor 20 stops, and energy transfer from the second inductor 38 to the second capacitor 30 begins as soon as the energy transfer from the first inductor 20 to the second capacitor 30 stops.

Figure 3:
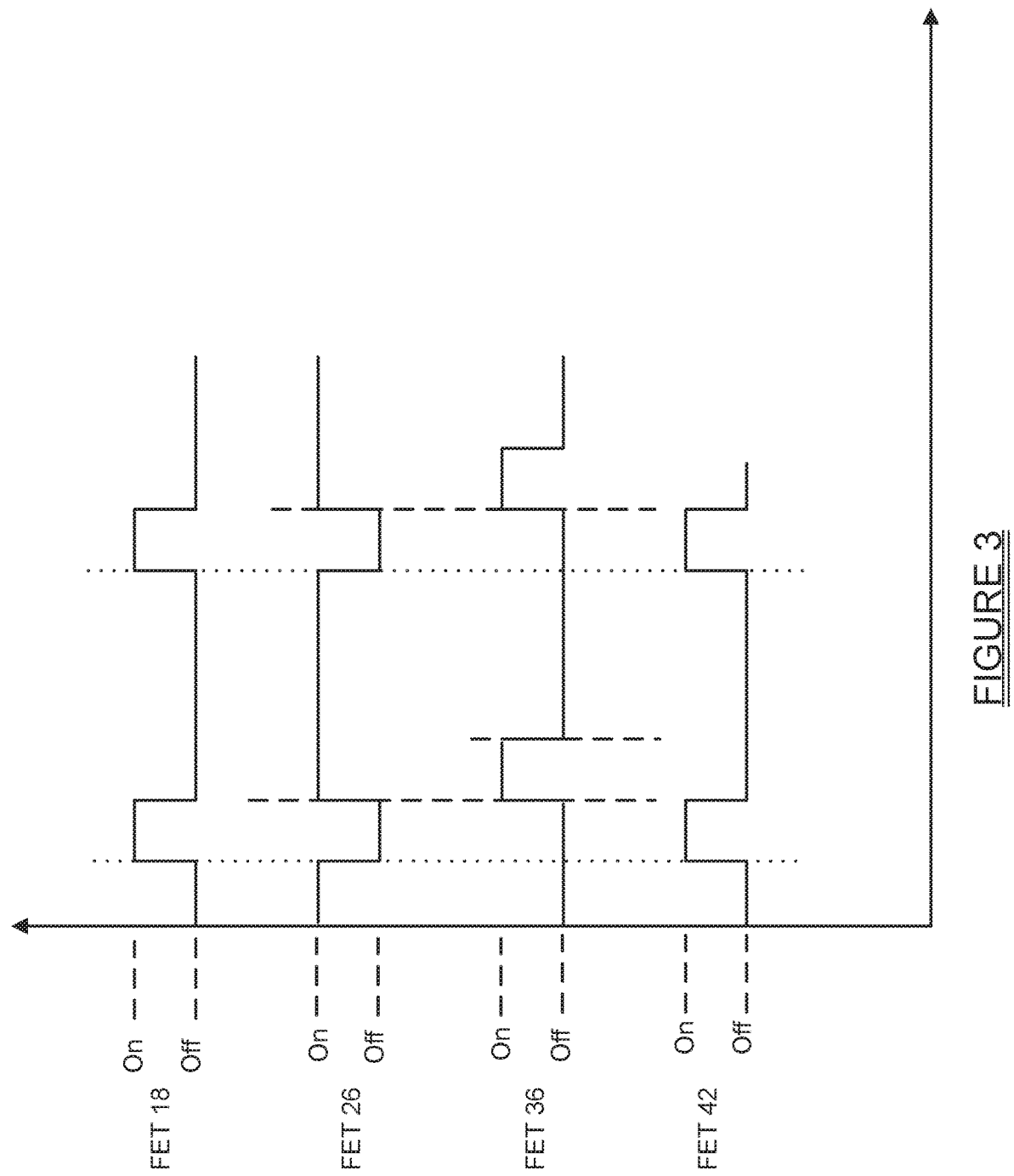
FIG. 3 is a timing diagram illustrating the turn on and turn off cycles of all of the FETs shown in FIG. 2.

Referring briefly to FIG. 3, the On and OFF states of the FETs 18, 26, 36 and 42 can be seen juxtaposed next to one another to illustrate the state of each FET (i.e., On or Off) relative to the others. First FET 18 is always on when second FET 26 is off, and third FET 36 is turned on when the first FET 18 is turned off. The fourth FET 42 is turned off when the third FET 36 is turned on, and the fourth FET 42 is turned on when the first FET 18 is turned on. In practice, the period between successive turn on pulses for each of the FETs 18, 26, 36 and 42 will lengthen over time due to resistive losses and other factors, but this has been ignored to simplify the illustration of the turn-on and turn-off timing of the FETs in FIG. 3.

The use of the additional energy transfer subsystem 32 allows the first and second inductors 20 and 38, respectively, to alternately be storing energy and transferring stored energy. A significant advantage of this operation is that the amount of energy removed from the first capacitor 14 in any given time period can be virtually doubled without increasing the current flow in the system 10. This is achieved by the controller 12 operating to begin the energy transfer to the second inductor 38 only after the current flow to the first inductor 20 has been stopped, and vice versa. In this manner the total current does not exceed the maximum predetermined current of a conventional single pulse circuit, such as shown in FIG. 1. This keeps the resistive losses of the system 10 essentially the same as that of the prior art circuit of FIG. 1, but while providing a significant reduction in the time that it takes to fully discharge the first capacitor 14. This reduction in time can be up to about 50%.

FIG. 4 shows a plurality of diagrams to illustrate the timing of energy transfer between the first capacitor 14 (C1) and the first and second inductors 20 and 38 (L1 and L2), as well as from inductors 20 and 38 to second capacitor 30 (C2), early in the transfer cycle. FIG. 5 shows a plurality of timing diagrams for the same energy transfer operations of FIG. 4, but instead occurring late in the transfer cycle, that is, as second capacitor 30 (C2) is approaching its maximum energy storage. One will note that the time interval required for each of the first inductor (L1) and the second inductor (L2) to fully transfer their stored energy to C2 significantly lengthens towards the end of the charge transfer cycle.

While the system 10 has been described in connection with two inductors, it will be appreciated that three or more inductors may potentially be incorporated in the system 10 to further reduce the transfer time for the energy in the first capacitor 14 to be transferred to the second capacitor 30 or to optimize performance of the process.

The system 10 achieves the above-described significant reduction in discharge time for the first capacitor 14 with the use of only a few additional component parts (i.e., components 36, 38 and 42) that form the additional charge transfer subsystem 32.

And while the system 10 has been described as forming a part of a desalination system, it will be appreciated that the system 10 could be used with little or no modifications in virtually any other application where stored energy needs to be transferred from one capacitor to an inductor, and then from the inductor to another capacitor.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions; layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A capacitive deionization system comprising:
   a controller;
   a first capacitor for collecting ions in a fluid flowing through the first capacitor to initially charge the first capacitor;
   a second capacitor;
   an energy transfer subsystem including:
     a first inductor for storing energy received from the first capacitor, and transferring the stored energy to the second capacitor;
     a first plurality of electronic switches controlled by the controller for controlling electrical communication between the first inductor and the first capacitor, and the first inductor and the second capacitor, a first one of the first plurality of electronic switches being interposed between the first capacitor and the first inductor to selectively enable and prevent a transfer of stored energy from the first capacitor to the first inductor, and a second one of the first plurality of electronic switches being interposed between the first inductor and the second capacitor to selectively enable and prevent a transfer of stored energy from the first inductor to the second capacitor; and
   an additional energy transfer subsystem responsive to the controller, and having a first connection point and a second connection point, the additional energy transfer subsystem coupled directly in parallel across the first and second capacitors to communicate with the first and second capacitors, and such that the first connection point is coupled to the first capacitor and the second connection point is coupled to the second capacitor, the additional energy transfer subsystem including:
     a second inductor for receiving energy from the first capacitor while the first inductor is transferring the stored energy to the second capacitor, and for discharging energy from the second inductor to the second capacitor while the first plurality of electronic switches is allowing communication between the first inductor and the first capacitor to again charge the first capacitor, such that the controller controls the additional energy transfer subsystem so that the second inductor is charging only while the first inductor is discharging, and further controls the first plurality of electronic switches so that the first inductor is charging only while the second inductor is discharging.

2. The system of claim 1, wherein the additional energy transfer subsystem is controlled by the controller.

3. The system of claim 2, wherein the additional energy transfer subsystem includes a second plurality of electronic switches controlled by the controller.

4. The system of claim 1, wherein the system comprises at least one of:
   a desalination system for removing salt from salt water; or
   a deionization system for removing ions from a fluid containing the ions.

5. The system of claim 3, wherein the first plurality of electronic switches comprises a pair of first transistors, and wherein the second plurality of electronic switches comprises a second pair of transistors.

6. The system of claim 3, further comprising a current sensing resistor and a voltage detection circuit coupled across the current sensing resistor for monitoring a magnitude of a current flow through the first inductor.

7. The system of claim 6, wherein an output of the voltage detection circuit is coupled to the controller.

8. The system of claim 3, wherein the first plurality of electronic switches comprises first and second field effect transistors (FETs), and wherein the second plurality of electronic switches comprises third and fourth FETs, and wherein the first one of the first plurality of electronic switches is the first FET, and is interposed between the first capacitor and the first inductor.

9. A capacitive deionization system comprising:
   a controller;
   a first capacitor in the system for collecting ions in a fluid flowing through the first capacitor;
   a second capacitor in the system to enable discharging of the first capacitor;
   a first inductor for storing energy received from the first capacitor, and transferring the stored energy to the second capacitor;
   first and second electronic switches controlled by the controller for controlling a transfer of energy from the first capacitor to the first inductor, and from the first inductor to the second capacitor, respectively, the first electronic switch being interposed between the first capacitor and the first inductor to controllably enable and prevent a transfer of charge from the first capacitor to the first inductor, and the second electronic switch being interposed between the first inductor and the second capacitor;

an additional energy transfer subsystem coupled at a first connection point to the first capacitor, and at a second connection point to the second capacitor, such that the additional enemy transfer subsystem is coupled in parallel between the first and second capacitors and communicates directly with the first and second capacitors, the additional energy transferring subsystem including:

a second inductor;

third and fourth electronic switches controlled by the controller, the third electronic switch interposed between the first capacitor and the second inductor to controllably enable and prevent a transfer of charge from the first capacitor to the second inductor, and the fourth electronic switch interposed between the second inductor and the second capacitor to control a transfer of charge from the second inductor to the second capacitor;

the first and third electronic switches further being tied in parallel directly to the first capacitor, and the second and fourth electronic switches further being tied in parallel directly to the second capacitor;

the second inductor for receiving energy from the first capacitor while the third electronic switch is closed and the fourth electronic switch is opened, and for transferring an energy stored in the second inductor to the second capacitor when the third electronic switch is opened and the fourth electronic switch is closed; and the controller configured to control the first, second, third and fourth electronic switches such that:

the second and third electronic switches are both controlled by the controller to be simultaneously conducting during a first time interval to enable the second inductor to receive energy from the first capacitor while the first inductor is transferring stored energy therein to the second capacitor, and further such that the first and fourth electronic switches are controlled by the controller to be non-conducting during the first time interval to prevent charging of the first inductor while simultaneously preventing communication between the second inductor and the second capacitor, and further such that during a second time interval subsequent to the first time interval, the controller controls the first and fourth electronic switches to be conducting and the second and third electronic switches to be non-conducting, so that the first inductor receives energy through the first electronic switch from the first capacitor while communication between the first inductor and the second capacitor is prevented by the second electronic switch, and communication between the first capacitor and the second inductor is prevented by the third electronic switch, while enabling the second inductor to transfer energy stored therein through the fourth electronic switch to the second capacitor.

10. The system of claim 9, further comprising a current sensing resistor configured in series with the first inductor for sensing a current flow through the first inductor.

11. The system of claim 10, further comprising a voltage detection circuit in communication with the current sensing resistor for detecting a voltage drop across the current sensing resistor.

12. The system of claim 11, wherein the controller is configured to use information from the voltage detection circuit to determine how to control the first, second, third and fourth electronic switches.

13. The system of claim 9, wherein each of the first, second, third and fourth electronic switches comprises a field effect transistor (FET).

* * * * *